Dec. 6, 1949     O. E. CARMAN     2,490,015
PROCESS FOR IMPROVING THE DIGESTIBILITY OF MILK
Filed May 22, 1947
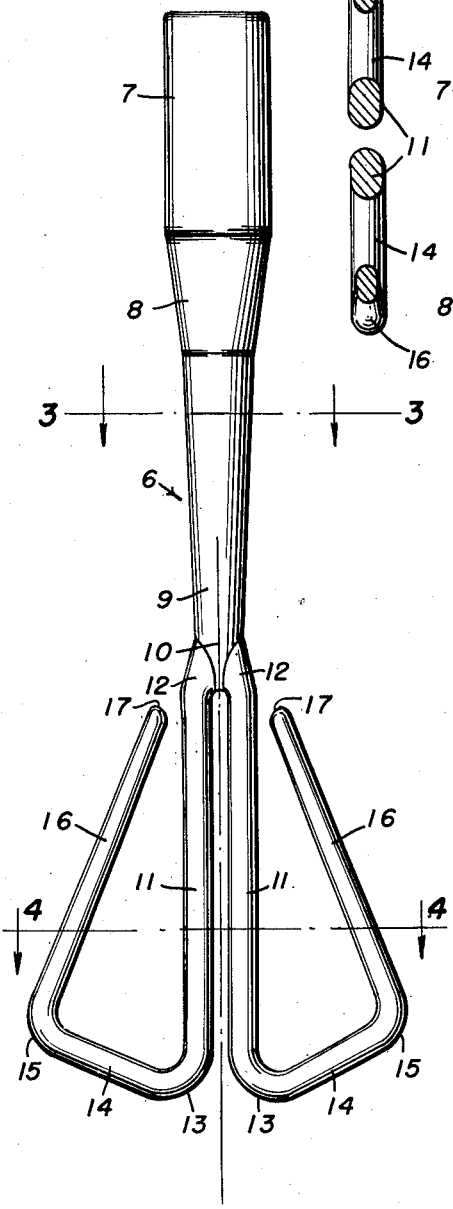
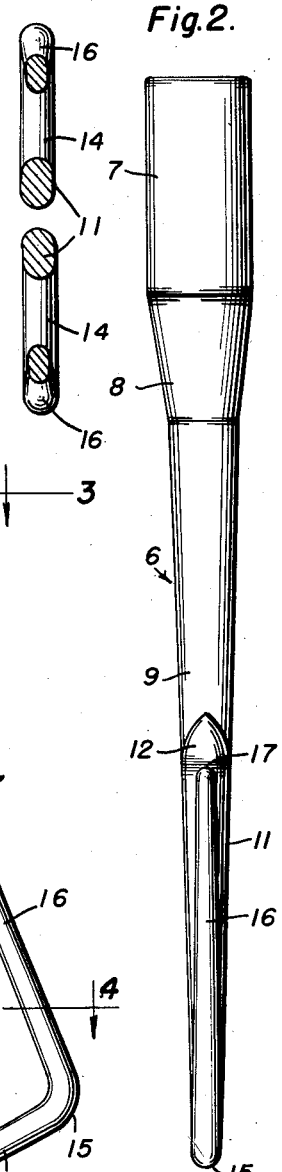
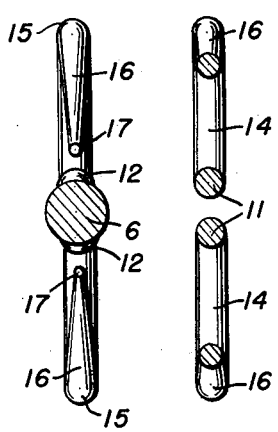
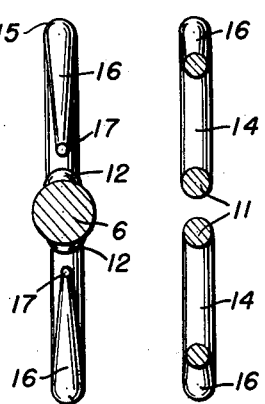
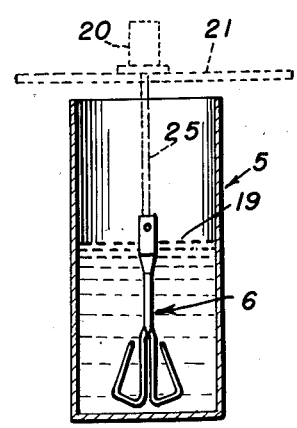
Inventor
Owsley E. Carman Patented Dec. 6, 1949

2,490,015

UNITED STATES PATENT OFFICE 2,490,015

PROCESS FOR IMPROVING THE DIGESTIBILITY OF MILK

Owsley E. Carman, Vale, Oreg.

Application May 22, 1947, Serial No. 749,730

5 Claims. (Cl. 99—60)

This invention relates to a process and apparatus for treating cow's milk and it has for its principal object to provide a method and means for markedly improving the digestibility of milk and for reducing the bacteria count thereof.

The present application is a continuation-in-part of my co-pending application Serial No. 490,666, filed June 12, 1943, and now abandoned, which was a continuation-in-part of a prior application Serial No. 281,459, filed June 27, 1939, now abandoned.

Before describing the invention, the technical facts on which it is based may first be recapitulated.

It was first discovered by V. Storch ("On the structure of fat globules in cow's milk," Analyst 22,197) that the fat globules in cream carry adsorbed substances at their surface and a series of investigations has been carried out among others by Hattori (Journal Pharmacological Society of Japan 49,332; 1929); H. F. Wiese and L. S. Palmer (Journal of Dairy Science 15, p. 5, 1932; 16, No. 1, 1933); Charles E. Rimpila and L. S. Palmer (Journal of Dairy Science 18, No. 12, 1935); Ch. E. Rimpila, "Factors influencing the composition of the adsorption membranes around the fat globules," July 1959; N. P. Tarassuk and L. S. Palmer (Journal of Dairy Science vol. 22, No. 7, 1939, and vol. 18, vol. 19, p. 323, 1936), and of L. S. Palmer and Samuelson (Proc. Soc. Ep. Biol. Med., vol. 21) showing that these adsorbed substances were chemically and physically different from other substances contained in cream, that they stabilize the emulsion, that they contain a protein and phospholipides and that the latter chiefly consist of a fraction resembling a lecithin. It is now assumed that the phospholipide fraction is chiefly made up of lecithin and cephalin and it has been established that the protein is different from any of the known proteins of milk and that it is not chemically bound to the phospholipides. The sum of these components represents approximately 0.6% to 0.89% of the butter fat.

It was also found that the composition of the adsorbed substances is variable to a certain degree from one natural cream to another.

It was first assumed that the adsorbed substances were present in the form of a protective adsorption membrane surrounding the covering or surface of the fat globules. Although the name "adsorption membrane" is still generally used to designate the adsorbed substances, the assumption that the fat globules are contained within a "hull" has not been confirmed and on theoretical grounds it is unlikely that a continous membrane or hull is formed.

This so called, "adsorption membrane" has a protective function insofar as it protects the fat globules against hydrolysis by enzymes and the rapid onset of rancidity. This fact in itself, of course, greatly affects the digestibility of milk. The above named investigators, starting from the fact that the "adsorption membrane" of natural cream is variable, were able to establish the last named fact. The digestibility seems to be influenced mainly by the phospholipide fraction.

Various studies have also been made as regards agitation of milk. The theory of the mechanical treatment of milk by agitation and its influence was first developed by O. Rahn (O. Rahn and P. F. Sharp, Physik der Milchwirtschaft, Berlin 1921 and 1928). The original theory was not confirmed completely, but H. F. Wiese and L. S. Palmer, Journal of Dairy Science, vol. 16, No. 1, 1933, state in their "conclusions," p. 55, that a large part of the fat globule "membrane" is apparently removed during churning, and Ch. E. Rimpila (in his pamphlet above quoted, July 1939) ascribes the different quantities of the said "membrane" found, partly to the mechanical agitation to which the milk was subjected. The last named investigator, however, also draws attention to a biological factor which is active in the formation of the "membrane" and states that it is extremely likely that the said "membrane" is formed or rapidly increases after the milk has left the udder. The thickness of the "membrane," therefore, seems not only to be related to the time which elapsed between the milking and the moment of consumption or investigation, but is also related to the temperature to which the milk was subjected. No exact and systematic research has been done in this respect.

The present invention is based on the above explained facts. The main problems consists in increasing the digestibility of milk without affecting its stability and increasing the tendency to develop rancid odors and flavors. The development of such odors and flavors is the source of great trouble to the dairies and any increase in the tendency to form such odors or flavors amounts to a practically unsurmountable obstacle to the introduction of a treatment favoring this increase.

From the above statement of facts it will, therefore, be clear that the problem stated involves great difficulties because effective protection against rancidity or preliminary stages leading to it requires the presence of an adsorption "film" which impairs the digestibility.

The two conflicting requirements may however both be met by balancing them, this being the essence of the discovery on which the invention is based. This balancing operation consists in the removal of a part of the adsorption or interface "film," leaving however a sufficient portion to secure protection against enzymes such as lipase. Nevertheless, a substantial portion of the said adsorption "film" may be removed which is sufficient to obtain an increase of the digestibility of milk to a marked extent.

In order to perform this balanced film removal a treatment removing the film to a limited extent is obviously necessary. It has also been found that in order to obtain the desired result the phospholipide substances which seem to be those mainly affecting the digestibility have to be removed to a greater extent than the above named (not identified) protein, which apparently contributes greatly to the protection of the fat globules against hydrolysis, so that after treatment not only the quantity of absorbed substances relative to the butter fat has markedly decreased but the relative content of protein in said absorbed substances has increased.

The treatment to which the milk is subjected consists in a rotary agitation including vibration. No means exist as far as applicant's knowledge goes, to observe or to determine directly the velocity of the milk particles and fat globules acquired during an agitating or vibrating movement. However, the decrease of the adsorption substances around the fat globules of the cream may be quantitatively measured by Friese's, Palmer's, and Rimpila's method of washing described in the above cited treatises. The effect of the treatment is, therefore, directly observable.

The treatment is performed by means of the apparatus, a preferred embodiment of which is shown by way of example in the accompanying drawings, in which:

Figure 1 is a side elevational view of the stirrer.
Figure 2 is an edge elevational view thereof.
Figures 3 and 4 are horizontal sectional views taken on the lines 3—3 and 4—4, respectively, of Figure 1 and looking downwardly in the direction of the arrows.
Figure 5 is a transverse vertical sectional view on a reduced scale showing in approximate relative proportions, a stirrer in operative position in a milk container in accordance with the invention, and
Figure 6 is a cross sectional view taken on line 4—4 of Figure 1 through a modification of the agitator.

The agitator or stirrer is designated in general by the reference 6. It comprises an upper butt portion 7, by means of which the agitator is coupled with suitable driving means and a substantially coaxial stem or shank portion 9 which is either cylindrical or slightly conical and which is connected with the butt portion 7 by a tapering or conical portion 8 co-axial with the other portions. The three co-axial portions mentioned are made of steel. The agitator comprises two wings which are integral with the stem or shank portion and are made of high carbon steel of the variety known as "music wire material" or of the steel used for automobile springs. Each wing comprises a rod 11 arranged eccentrically with respect to the axis of the stem (a portion of which is shown in dots and dashes) but is parallel thereto. The rods of the two wings are arranged at a distance so that a space is left between them. The rods may taper off slightly and are joined to the shank 9 by means of inclined neck portions 12.

At the lower end the rods 11 are bent outwardly and upwardly, forming slanting outwardly projecting wing portions 14 which are joined to the rod sections 11 by well rounded zones 13, bent as far as possible along the arc of a circle. These outwardly and upwardly slanting wing sections 14 are of limited length and are usually not exceeding in length about one-half of the rods 11. They are again rounded at their outer ends forming arcuate zones 15 which carry the free wing ends 16 made of slightly tapering rods which project towards the neck portions 12 joining the rods 11 and the stem or shank 9. The rods 16 are bent approximately to form a right angle with the upwardly slanting wing portion 14 and their ends 17 are very close to the neck portion, but are arranged at sufficient distance to avoid contact during excessive vibration.

Each wing of the agitator, therefore, has approximately the form of a nearly closed triangular frame and forms a freely oscillating or vibrating system with one free end, only one end being attached to the fixedly held portions or sections of the system. While the lever arm of the leg 11, forming the hypotenuse of the right triangle, with respect to the axis of rotation is small, this lever arm increases for the other legs and is at its maximum at the bend 15 joining the two smaller legs of the triangle.

The two wings are preferably arranged in the same plane, but are quite independent of each other as regards vibration. Together they form a rotating nearly closed framework approximately of deltoid shape.

When rotated around the axis of the shank 9 in a medium a number of superposed free oscillations or vibrations will be set up corresponding to the natural vibration of the system and of its components.

The lowest vibration which may be detected will be termed the "fundamental" vibration.

The agitator is preferably placed into a vessel or receptacle 5 made of one of those materials which are customarily used in connection with milk such as glass, stainless steel or enamel coated metal and its butt portion is coupled by any well known means with the shaft 25 of a motor 20. The latter is shown to be supported on a suitable support 21. It is to be understood however that the means for driving the agitator 6 are conventional and do not form part of this invention.

Milk is filled into the container up to a level 19 which should be well above the agitator wings. Preferably the agitator wings are located in the lower half of the fluid column.

When the wings are rotated they vibrate on account of the above described construction as they form freely vibrating systems attached at one end. The oscillation has been measured experimentally. A definite specimen (Example a) of an agitator had wings of the approximately triangular configuration shown in the drawing and a length of the legs or sections forming the triangle of 3⅞ in., 1¾ in. and 3½ in. respectively. The span of the two wings between the points farthest from the axis of rotation was 3⅝ in., the rod was circular near the neck and had a diameter of 3/16 in. The rod while tapering was flattened and the diameters of the oval or elliptical ends of section 16 tapered off to ⅛ x 1/16 in.

When this agitator was rotated at a speed of 1525 revolutions per minute in air a fundamental vibration of 286 osc./second was measured. Also an overtone vibration of 337 osc./sec. could be measured.

Another specimen (Example b) of the oscillator had legs of 4 in., 1¾ in., and 3¾ in., respectively, and a span of 3⅝ across the farthest points of the wings. It was connected with a shank of ½ in. in diameter and the rods were of a flattened oval or elliptical cross section of ⅛ x ¼ in. tapering towards the end of leg 16 which had dimensions of approximately ⅛ x 1/16 in. The specimen was rotated at a speed of 1725 revolutions per minute and gave a vibration of 235 osc. per sec. with an overtone oscillation of 352 osc. per sec.

The overall length of the agitator which is however without influence on the period of oscillations for theoretical reasons and is only mentioned for the sake of completeness including the shaft and butt portion was 10½ in. The larger angle of the right triangle was around 64-66° (at the base between sections 11 and 14) in both cases.

Experiments made with a number of agitators show that the effect consisting in the partial removal of the "membrane" increases even if the speed of revolution decreases provided that the rate of the fundamental vibration increases. It was also found that the increase of the vibration rate is more effective than the increase of the speed of revolution. The agitator mentioned in Example a having a basic vibration rate of 286 osc./sec. but operating at a reduced speed of 1525 R. P. M. proved to be more effective for the purposes of the removal of the "membrane" material than the agitator vibrating at a rate of 235 osc./sec. but rotating at a speed of 1725 R. P. M.

It will also be clear that the rotational speed is variable and may be regulated within comparatively wide limits, these limits as far as at present established varying at least between 1200 and 3000 R. P. M. in constructions with different dimensions. The same agitator may be rotated at different speeds of rotation for instance between 1500 R. P. M. and 1900 R. P. M. Likewise the vibrational speed, as measured in air varied between 180 and 400 in different agitators rotating at the above mentioned speeds.

The agitator is placed into a receptacle which is in proportion to its size; for instance, the agitator mentioned in Example a is placed in a vessel or receptacle, not smaller than twice the span of the agitator wings, which is for instance 9 in. and is filled to a level at least 1½ times the height of the wing, or more, say to a depth equal to the diameter so that above the agitator there is a fluid column of some depth.

The treatment of the milk according to the present invention consists in subjecting it to agitation and vibration by means of the agitator as described. The most perfect results as regards flavor, stability and digestibility were obtained when the milk was subjected to this treatment forthwith when coming from the udder of the cows, without any intervening cooling period or cooling process and when its temperature was around 98° F.

However, the results with cooled milk processed at a temperature of 40° F. were still satisfactory and the milk taken from the cow's udder may therefore be taken to a plant for processing it and may be allowed to cool in the meantime. More perfect results than those with the milk processed cold were obtained when the cold milk was re-warmed to a temperature between 65° F. and 98° F. for processing purposes.

It was found that the time of treatment found for a specific agitator varies with the temperature and that longer treatments were required with the same agitator when the milk was processed in a cold state. Other factors, among them the feed of the cows seem to be of some influence which, however, could not be exactly determined.

With an agitator such as described in Example a running at 1525 R. P. M. and having a fundamental vibration of 286 osc./sec. operating in a container such as above stated of 9 in. diameter filled with milk to about 9 in. processing with milk of a temperature of 98° F. lasted about 10 to 12 minutes.

When milk was processed with the same agitator after it had been cooled to 65° F. the processing lasted about 18-20 minutes while processing at about 40° F. had to be carried on for around 30 minutes. With different containers the processing period varies on account of the quantity subjected to the processing by the same mechanical agitator as will be clear. With a container having a diameter of about 12 inches, the milk being filled around 8 in. deep therein, using the agitator mentioned in Example b rotating at 1725 R. P. M. and vibrating at a rate of 235 osc./in. processing lasted 14 minutes while under exactly the same conditions using a container 10 in. wide and filled to about 10 in. deep processing lasted only 10 minutes.

It is therefore clear that the processing time is of higher variability than dimensions, speeds and vibrations as it depends on a larger number of variables.

While re-warming of the milk for processing it after cooling furnishes milk with good results it does not seem that the results are in every way quite as good as those obtainable if the milk to be processed is taken directly from the udder of the cows. This expresses itself in the flavor and in the stability of the milk. However, the difference could not be expressed in definite chemical or other terms. Indications are that more protein and less phospholipide substances are removed in this case by the processing.

The process also reduces the size of the cream globule. Tests seem to indicate that the size of the globules is dependent on the rotational speed of the agitator. As there is much variation in the size of the cream globules on account of biological factors, the influence of this factor on the digestibility and on the "membrane" could not be determined with a sufficient degree of accuracy.

In practicing the invention according to the first example, the milk to be processed is strained directly from pails or milkers into milk cans of suitable size, hereinbefore referred to as containers or receptacles, and is then subjected to the action of an agitator of suitable dimensions as above described.

Alternatively as above stated the milk is first cooled and then processed and is preferably re-warmed before being processed. All three methods give practical results although with the above stated differences as regards flavor and stability.

In practice it is found that the most practical and efficient guide as regards the time of processing when carrying out the process with respect to a batch of milk is not through analysis but through tasting of the milk during progressive stages of the processing. In the early stages of the process an increase in the creamy flavor of the milk takes place, which increases progressively up to the end of the processing. Should the processing be continued beyond the point at which maximum creamy flavor is attained, an unfavorable change in the taste of the milk takes place, followed by development of rancidity, either or both of which indicate over-processing. The mentioned progressive increase in creamy flavor is accompanied by increased softness and smoothness in the milk detectable by the palate.

If the processing period be divided arbitrarily into three equal periods, it is found that the rate of increase in creamy flavor, softness and smoothness is greatest in the third or final period.

Improved milk in accordance with the invention can be obtained with the described agitator running at speeds between 1200 and 3000 R. P. M. The best results have thus far been obtained with the agitator running at 1525 R. P. M. and having a fundamental vibration of 286 osc./min. with the times of processing and sizes of milk containers selected and proportioned as disclosed above.

The removal of the "membrane" substances from the fat globules can be determined without very great difficulty by processes developed by the investigators named above. It is found in this case that 50%–65% of the phospholipide substances and between 10%–25% of the protein of the "membrane" is removed from the globules by the process according to the invention and is dispersed in the milk.

EXAMPLE 1

Milk was treated in a container of 10 in. diameter filled to about the same depth with the agitator described in Example b, the processing time being 10 minutes. Processing took place at a temperature of the milk of 98° F. with milk taken directly from the cow's udder.

In order to determine the influence of the processing on the fact globule "membrane" samples of milk treated by means of the agitator according to Example b, and of untreated milk were taken from the same batch of milk. Creams were washed free of milk constituents according to the method described in the Journal Biol. Chemistry, vol. LXXVI, p. 537, by Titus and others, and samples were run in under 10 vol. of water at 95° F. held in tall crocks containing 1:2500 parts of formaldehyde. The crocks were then placed in a cold storage room (40° F.) and the cream was allowed to rise to the surface. The cream was skimmed and the washing was repeated twice. The collected cream was adjusted to 15%–20% butter fat and used for nitrogen and phosphorus determination.

Phospholipins and butter fat were extracted from 10–15 g. samples by the method described by Macro, Rose and Gottlieb in Research Bulletin No. 175, Ames, Iowa. The total butter fat was computed and the fat samples containing the phospholipin fraction were ashed. This permitted phosphorous determinations on ash to be made by means of the method described by Briggs (Journal Biol. Chemistry LIX, 255, 1924).

In order to convert phosphorus to phospholipide values results were multiplied by 25 (Journal of Dairy Science 16, 445, 1933, G. E. Holm).

The following results were obtained in the way described:

TABLE 1

*Sample 1*

|  | Phosphorus, mg./100 gm. fat | Phospholipides, mg./100 gm. fat |
|---|---|---|
| Milk not processed | 17.0 | .425 |
| Milk processed with agitator according to Example b, 14 minutes | 11.6 | .290 |
| Difference | 5.4 | .135 |

Percentage decrease of 32%.

*Sample 2*

|  | Phosphorus, mg./100 gm. fat | Phospholipides, mg./100 gm. fat |
|---|---|---|
| Milk not processed | 10.5 | .262 |
| Milk processed with agitator according to Example b, 14 minutes | 6.1 | .152 |
| Difference | 4.4 | .110 |

Percentage decrease of 42%.

EXAMPLES 2 AND 2a

Milk was processed in a container of 9 in. filled with milk to about the same depth with the agitator described in Example a at a temperature of 98° F. taken directly from the udder of the cow for 12 minutes. The agitator was rotating at 1525 R. P. M. and was vibrating at the rate of 286 osc./min. as above described.

Moreover milk was processed under identical conditions at a temperature of 65° F. the time of processing being in this case 20 minutes. Samples were taken from Jersey and Holstein cows.

Again as described in Example 1, the phosphorous and the phospholipide substances were determined, using the method as described for treated and unprocessed milk.

The following results were obtained:

|  | Phosphorus | | Phospholipides | |
|---|---|---|---|---|
|  | Jersey fatty extract, mg./100 gms. | Holstein fatty extract, mg./100 gms. | Jersey fatty extract, mg./100 gms. | Holstein fatty extract, mg./100 gms. |
| Unprocessed milk | 23 | 18 | .575 | .450 |
| Milk processed warm with agitator Example a, 12 min. at 98° F | 8 | 7.7 | [1].200 | [3].192 |
| Milk processed cold with agitator Ex. a, 20 min. at 65° F | 10 | 8.4 | [2].250 | [4].210 |

PERCENTAGES:
[1] 65% of phospholipides removed from "film."
[2] 56% of phospholipides removed from "film."
[3] 57% of phospholipides removed from "film."
[4] 53% of phospholipides removed from "film."

From a great number of further samples it follows that under the conditions of Examples 2 and 2a, 40–70% of the phospholipides are removed from the "film" or "membrane."

EXAMPLE 3

In this example treatment was exactly the same as described in Example 1, using the agitator of Example b. However, nitrogen determinations were made in crude membrane material as prepared after the method of Titus and Sommer above described. This procedure was somewhat shortened by thoroughly washing the residue on filter paper with successive portions of hot ethyl alcohol and hot ethyl and petroleum ether. Washings were collected in the same flask into which fat had drained and total butter fat of the sample was calculated on this fraction. The washed residue together with the ashless filter paper on which it was held were transferred to Kjeldahl flasks and regular macro Kjeldahl tests were made. Kjeldahl determinations were also performed on residues obtained by filtering water and ether fractions of samples used for phospholipide assay.

Sample 1

|  | Nitrogen, gm./100 cc. | Protein, gm./100 cc. |
|---|---|---|
| Milk not processed | .0880 | .550 |
| Milk processed with agitator according to Example b during 14 minutes | .0560 | .350 |
| Difference | .0320 | .200 |

Percentage of protein removed from film, 32%.

Sample 2

|  | Nitrogen, gm./100 cc. | Protein, gm./100 cc. |
|---|---|---|
| Milk not processed | .0942 | .593 |
| Milk processed with agitator (Ex. b) during 14 min | .0570 | .356 |
| Difference | .0379 | .237 |

40% of the protein was removed from the "film."

EXAMPLE 4

Milk was treated exactly as described in Examples 2 and 2a with agitator according to Example a rotating at 1525 R. P. M. and vibrating with a fundamental oscillation of 286 osc./sec.

Again samples of different cows were treated at different temperatures, one sample at 98° F. and the other at 65° F. as described in Examples 2 and 2a, the treatment periods being those stated in these examples.

The following results were obtained.

EXAMPLES 5

The influence of the process on the bacterial count of processed and non-processed milk of the same batch was determined, the processed milk being treated as described in Example 1, by means of an agitator making 1725 R. P. M. and oscillating at the rate of 235 osc./sec. as the fundamental oscillation. The milk was treated in receptacles as stated above for a period of 14 minutes.

Standard methods and techniques were used throughout the studies which resulted in the following tables. Immediately after processing, the milk contained more bacteria than normal milk, a fact which is due to the fact that processing breaks up chains and clumps of bacteria which then show more colonies on the plates. In order to obviate this error milk was processed one minute and then a sample taken to be used as the normal or unprocessed sample. The important consideration is the bacterial growth during the 24 or 48 hours following the processing. A number of such experiments were conducted. Table I shows representative data:

TABLE I

[Bacterial counts 24 hours after processing (8° C. storage)]

| Normal | Processed |
|---|---|
| 50,400 | 19,200 |
| 59,200 | 22,400 |
| 56,800 | 25,600 |
| 2,100 | 1,400 |
| 10,750 | 6,350 |

It is seen that processing the milk results in a markedly lowered bacterial count at the end of 24 hours.

As air is incorporated into the milk during the processing, it is necessary to determine whether oxygen is the effective principle in this case. The following experiment was therefore, conducted: A portion of a mixed milk sample was treated as described above while another portion was similarly treated except that pure oxygen was run into the milk chamber during the processing. After the processing was completed both samples were stored in an ice box and bacterial counts were made at 4 hour intervals for 24 hours. Table II shows the results of this experiment.

TABLE II

[Bacterial counts on milk processed in air or in an atmosphere of oxygen bacteria per cc. (8° C. storage).]

| Hrs. After | Air | Processed | Oxygen Normal | Processed |
|---|---|---|---|---|
| 0 | 900 | 1,480 | 3,200 | 4,600 |
| 4 | 900 | 1,483 | 3,400 | 4,633 |
| 8 | 2,600 | 2,575 | 3,416 | 4,555 |
| 12 | 2,900 | 2,250 | 3,533 | 4,500 |
| 16 | 3,125 | 2,675 | 3,850 | 4,000 |
| 20 | 5,400 | 2,225 | 5,100 | 3,225 |
| 24 | 5,450 | 2,190 | 5,175 | 3,185 |

|  | Nitrogen | | Protein | |
|---|---|---|---|---|
|  | Jersey Fatty extract, gm./100 gms. | Holstein Fatty extract, gm./100 gms. | Jersey Fatty extract, gm./100 gms. | Holstein Fatty extract, gm./100 gms. |
| Unprocessed milk | .089 | .086 | .566 | .538 |
| Milk processed warm with agitator Example a 12 min. at 98° F | .078 | .074 | ¹.488 | ².463 |
| Milk processed cold with agitator Example a 20 min. at 65° F | .070 | .065 | ³.437 | ⁴.406 |

PERCENTAGES:
 (1) 14% of protein removed from "film."
 (2) 21% of protein removed from "film."
 (3) 14% of protein removed from "film."
 (4) 24% of protein removed from "film."

Bacterial growth was held at a low level at the temperature of storage. The results of processing are striking both in air and in oxygen.

At higher temperatures the effect or processing is also marked. Milk was processed as described previously and then incubated at 37.5 C. Samples were taken every 4 hours for bacterial counts. Table III shows the results of one such experiment.

TABLE III

[Bacterial counts on normal and processed milk incubated at 37.5° C. bacteria per cc.]

| Hrs. after processing | Normal | Processed |
|---|---|---|
| 0 | 14,000 | 15,625 |
| 4 | 26,266 | 21,866 |
| 8 | 59,866 | 25,600 |
| 12 | 808,000 | 342,000 |

The effect of processing is again marked even though the processed milk was incubated at the relatively high temperature of 37.5° C.

EXAMPLE 6

The influence of the process on the bacterial count of processed and non-processed milk of the same batch was determined, the processed milk being treated according to Example 2, with an agitator rotating at 1525 R. P. M. and vibrating at a rate of 286 osc./sec., during 12 minutes.

With methods and techniques as described in Example 5, the following representative data were obtained:

Lot #1

| Normal | Processed |
|---|---|
| 6,000 | 4,000 |
| 8,000 | 2,000 |
| 9,000 | 2,000 |
| 2,000 | 500 |
| 1,000 | no colonies |
| 1,500 | 1,000 |

Lot #2

| Normal | Processed |
|---|---|
| 5,000 | 4,000 |
| 3,500 | 1,500 |
| 8,000 | 3,000 |

From the foregoing examples it results that a limited removal of the "membrane" substances adsorbed to the fat globules is obtainable, that the process is easily regulable in several ways so as to be able to remove the "membrane" substances to the desired extent. The action is due to the treatment with the combined rotational and vibrational agitator. Low speed agitators of the usual type do not show any marked influence on the "membrane" substances.

It is to be emphasized that when best results are mentioned in the foregoing specification, this does not mean that such results are the sole results from which the advantages of the invention, for instance the advantage of higher digestibility, may be derived. The process described is a gradual process and one of its main advantages resides in the fact that it is finely and well regulable and therefore permits to adapt the process to the results to be obtained or desired by the investigation and by the practical dairy man. As high digestibility and stability of the milk are antagonistic requirements, according to the explanation given above, it will always be a question within the limits of practical consideration how far stability may be lowered and digestibility should be improved. These factors will naturally influence the speeds and periods of the treatment and other factors, among them also the dimensions and constructional details of the apparatus.

Therefore changes of certain factors influencing the intensity of process steps carried out or the dimensions or configuration of the apparatus are merely due to the fact that the process is of a flexible nature in order to be able to effect a compromise between antagonistic influences which is not a fixed one. Moreover the fact that the subject matter treated belongs to a chapter not fully investigated and that some of its aspects were not fully cleared up by research undertaken, made it necessary to specify details usually taken as granted, as being within expert knowledge. These specified details are therefore not necessarily limitations of the invention.

Having described the invention, what is claimed as new is:

1. A method of treating cow's milk for the purpose of partially removing the adsorption membrane material of the fat globules so as to render it more digestible while preserving a sufficient resistance against the development of rancidity which comprises subjecting milk which has been cooled in the operative phase following the milking operation, to a temperature of approximately 40–65° F. to a rotary agitation and vibration produced by a rotating and vibrating agitator rotating at a speed ranging from 1200–3000 R. P. M. and vibrating at a frequency ranging from 200–400 osc. per. sec. for a period of time of approximately 10–30 minutes and not exceeding a period determined by tests showing an increase of the creamery flavor of the milk.

2. A method of treating cow's milk for the purpose of partially removing the adsorption membrane material of the fat globules so as to render it more digestible while preserving a sufficient resistance against the development of rancidity which comprises re-warming cooled milk to a temperature of 98° F. and in subjecting it when re-warmed to a rotary agitation and vibration produced by a rotating and vibrating agitator rotating at a speed ranging from 1200–3000 R. P. M. and vibrating at a frequency ranging from 200–400 osc. per. sec. for a period of time of approximately 10–30 minutes and not exceeding a period determined by tests showing an increase of the creamy flavor of the milk.

3. A method of treating cow's milk for the purpose of partially removing the adsorption membrane material of the fat globules so as to render it more digestible while preserving a sufficient resistance against the development of rancidity which comprises subjecting milk in the operative phase following the milking operation when at a temperature of approximately 98° F. to a rotary agitation and vibration produced by an agitator with arms unilaterally supported for free vibration in a plane passing through the axis of rotation and moving through the liquid at a rotational speed of 1525 R. P. M. said arm vibrating with a fundamental frequency of approximately 285 osc. per sec. for a period of approximately twelve minutes.

4. A method of treating cow's milk for the purpose of partially removing the adsorption membrane material of the fat globules so as to render it more digestible while preserving a sufficient resistance against the development of rancidity which comprises subjecting cooled milk having a temperature of 65° F. to a rotary agitation and vibration produced by an agitator with arms unilaterally supported for free vibration in a plane passing through the axis of rotation and moving through the liquid at a rotational speed of 1525 R. P. M. said arm vibrating with a fundamental frequency of approximately 285 osc. per sec. for a period of approximately twelve minutes.

5. A method of treating cow's milk for the purpose of partially removing the adsorption membrane material of the fat globules so as to render it more digestible while preserving a sufficient resistance against the development of rancidity which comprises subjecting milk in the operative phase following the milking operation at a temperature of 40° F. to 98° F. to a rotary agitation and vibration produced by a rotating and vibrating agitator, rotating at 1200-3000 R. P. M. and vibrating at a frequency of 200-400 osc./sec. for a period of time ranging from 10 to 30 minutes and not exceeding the period determined by tests showing an increase of the creamy flavor of the milk.

OWSLEY E. CARMAN.

REFERENCES CITED

The following references are of record in the file of this patent:

UNITED STATES PATENTS

| Number | Name | Date |
|---|---|---|
| 1,046,648 | Roberts | Dec. 10, 1912 |
| 1,237,585 | Tripke | Aug. 21, 1917 |
| 1,432,592 | Catini | Oct. 17, 1922 |
| 1,437,246 | Horton | Nov. 28, 1922 |
| 1,489,182 | Weinberg | Apr. 1, 1924 |
| 1,831,499 | Losee | Nov. 10, 1931 |
| 1,942,058 | Harris | Jan. 2, 1934 |
| 1,949,047 | Hill | Feb. 27, 1934 |
| 2,084,894 | Davis | Jun. 22, 1937 |
| 2,122,029 | Davis | Jun. 28, 1938 |
| 2,192,199 | Myers | Mar. 5, 1940 |

FOREIGN PATENTS

| Number | Country | Date |
|---|---|---|
| 4,063 | Great Britain | of Mar. 17, 1887 |

OTHER REFERENCES

Wing: "Milk and its Products," pages 76, 84 and 85, published 1897 by the Macmillan Co., N. Y.